No. 688,821. Patented Dec. 17, 1901.
W. H. BATES.
AUTOMATIC BRAKE MECHANISM FOR RAILWAY CARS.
(Application filed May 6, 1901.)
(No Model.)
Fig. 1.
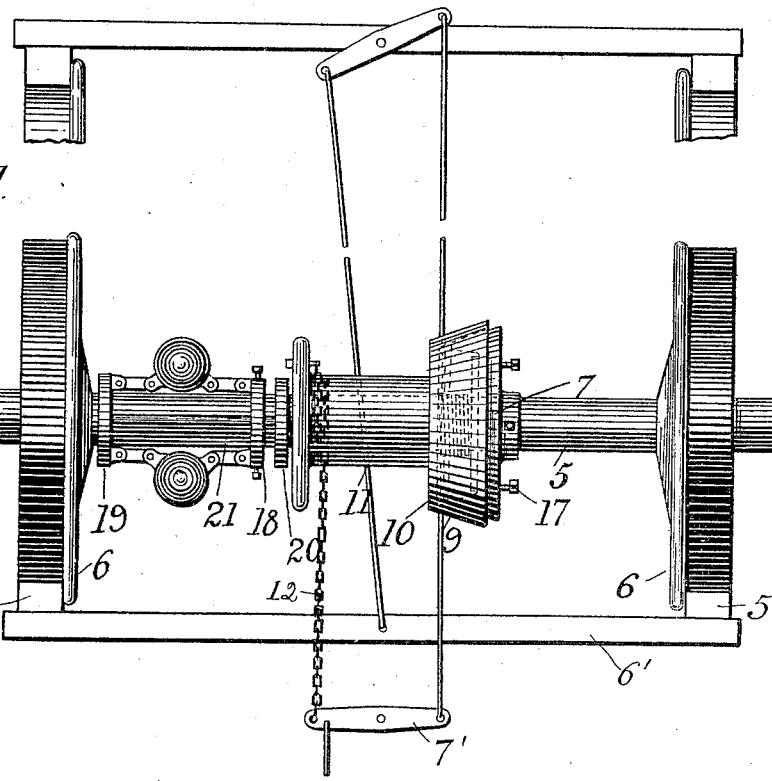
Fig. 2.
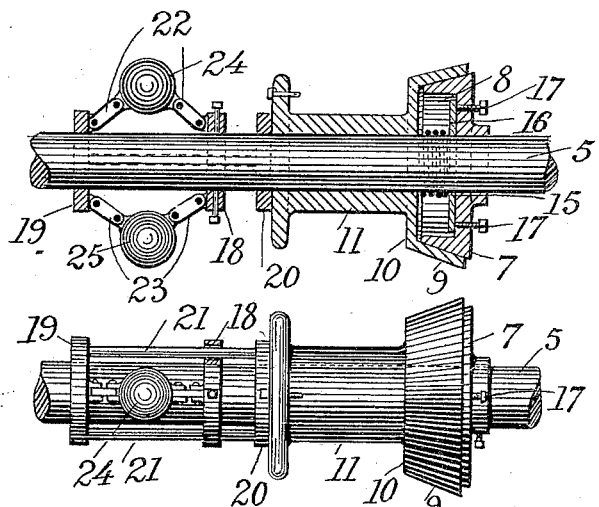
Fig. 3.
Witnesses
J. S. Bowen
Geo. H. Chandlee
William H. Bates, Inventor
by C. A. Snow & Co.
Attorneys

UNITED STATES PATENT OFFICE.

WILLIAM HURBERT BATES, OF DIXIE, WASHINGTON.

AUTOMATIC BRAKE MECHANISM FOR RAILWAY-CARS.

SPECIFICATION forming part of Letters Patent No. 688,821, dated December 17, 1901.

Application filed May 6, 1901. Serial No. 59,004. (No model.)

*To all whom it may concern:*

Be it known that I, WILLIAM HURBERT BATES, a citizen of the United States, residing at Dixie, in the county of Walla Walla and State of Washington, have invented a new and useful Automatic Brake Mechanism for Railway-Cars, of which the following is a specification.

This invention relates to brake mechanisms; and it has for its object to provide a brake mechanism which will be automatically applied when the speed of rotation of the parts have reached a predetermined point and wherein the pressure of the brakes will be increased as the speed increases.

In the drawings forming a portion of this specification, and in which like numerals of reference indicate similar parts in the several views, Figure 1 is an elevation showing the axle of a car-truck and adjacent brake beams and shoes and including the mechanism of the present invention. Fig. 2 is a view, partly in vertical section and partly in elevation, illustrating a portion of the axle with the mechanism in its applied position. Fig. 3 is a plan view showing the mechanism illustrated in Fig. 2.

Referring now to the drawings, there is shown the axle 5 of a car-truck, having the usual wheels 6 fixed thereon, and which axle is mounted in the usual manner, the specific mounting not requiring illustration. The wheels 6 have the brake-shoes 5', carried by the beam 6', which is connected in the brake system in the usual manner, said system including the lever 7'.

Upon the axle 5 is a tapered clutch-drum 7, held in place in any suitable manner, and the end face of this drum, at the minor end thereof, is recessed, as shown at 8, for a purpose to be presently explained.

The clutch-shoe of the mechanism is in the form of an annular flange 9, which projects laterally from the outer edge of the flange 10 at one end of a drum 11, which is mounted loosely upon the axle, so that the latter may turn freely therein under normal conditions and the drum may be slid longitudinally of the axle. A chain 12 is secured at one end to the drum 11 and is adapted to be wound thereon, the opposite end of the chain being attached to the lever 7', so that when the chain is wound on the drum 11 the lever will be operated to apply the brakes. When the drum 11 is slid longitudinally in one direction, the clutch-shoe thereof impinges against and incloses the clutch-drum with such friction as to cause the drum 11 to rotate with the clutch-drum and wind the chain up. When the slack has been taken out of the chain, there may be some slip between the shoe and drum and the strain imparted to the chain by the drum 11 will depend upon the friction between the shoe and drum. To return the drum 11 to carry the shoe from the clutch-drum when pressure upon the drum 11 is removed, a helical spring 15 is provided and is disposed within the recess 8 of the clutch-drum, said spring bearing at one end against the bottom of the recess and at the opposite end against the end of the drum 11. To directly receive the end of the spring, a washer 16 is disposed upon the shaft within the recess 8, and this washer is in direct contact with the inner end of the recess, and to vary the tension of the spring set-screws 17 are provided and engaged with threaded perforations through the web of the clutch-drum, these screws engaging the washer in the recess to move it in the direction of the drum 11.

To move the drum 11 with its clutch-shoe into operative position, a collar 18 is fixed upon the axle 5, and at opposite sides thereof are collars 19 and 20, which are slidable upon the axle, these two slidable collars being connected by means of the tie-bolts 21, passed loosely through openings in the fixed collar 18, so that when one loose collar is slid along the axle the other loose collar will be slid with it. At diametrically opposite points of the collars 18 and 19 are pivoted links, including an upper pair 22 and a lower pair 23, as illustrated, the links of each pair being pivoted to the ears of balls or other weighted bodies 24 and 25. Thus when the axle is rotated the bodies move outwardly by centrifugal force, and as the collar 18 is fixed against movement longitudinally of the axle the collar 19 is slid therealong, so that the collar is moved against the end of the drum 11 to move it longitudinally to engage the clutch-shoe with the clutch-drum. The greater the speed of rotation the greater the centrifugal force and consequent friction between the clutch members, so that there is a greater pull upon the chain 12 to apply the brakes, and when the speed of rotation of the axle is diminished the helical spring moves the drum 11, which in turn moves collars 19 and 20 to flatten out the links and draw the weights toward the axle, the brakes being thus automatically applied and retracted.

What is claimed is—

1. The combination with an axle having wheels fixed thereto, of brake-shoes for the wheels, a clutch-drum fixed upon the axle, a second drum disposed loosely upon the axle and having a shoe for engagement with the clutch-drum, means for holding the shoe and clutch-drum normally out of contact, a collar mounted slidably upon the axle for contact with the second drum to move it, a second slidable collar connected with the first collar, links pivoted to the second collar and to the axle, weights pivoted to the links, and a chain operatively connected with the brake-shoes and attached to the second drum to be wound thereon to apply the brakes.

2. The combination with an axle having wheels fixed thereto, of brake-shoes for the wheels, a clutch-drum fixed upon the axle, a second drum disposed loosely upon the axle and having a shoe for engagement with the clutch-drum, a helical spring disposed upon the axle between the drums, set-screws engaged with the clutch-drum and operably connected with the spring to vary the tension thereof, centrifugal means for moving the second drum with its shoe against the clutch-drum, and a chain operatively connected with the brake-shoes and attached to the second drum to be wound thereon to apply the brakes.

3. The combination with an axle having wheels fixed thereto and brake-shoes disposed in operative relation to the wheels, of a tapered clutch-drum fixed upon the axle and having a recessed face, a winding-drum mounted loosely upon the axle and having an annular clutch-shoe for engagement with the clutch-drum, a washer in the recess of the clutch-drum, a helical spring upon the axle between the washer and the winding-drum to hold the drums separated, set-screws engaged with the clutch-drum and in operative relation to the washer to move it and compress the spring, a collar fixed upon the axle, a collar disposed loosely upon the axle at each side of the fixed collar and mutually connected, links connecting one of the loose collars and the fixed collar and having weights connected therewith, the other loose collar being adapted for contact with the winding-drum to move it against the tendency of the helical spring to engage the clutch-shoe with the clutch-drum, and a chain operatively connected with the brake-shoes and attached to the winding-drum to be wound thereon when the latter is rotated, to set the brakes.

In testimony that I claim the foregoing as my own I have hereto affixed my signature in the presence of two witnesses.

WILLIAM HURBERT BATES.

Witnesses:
   T. M. McKINNEY,
   P. M. BATES.